United States Patent Office 3,086,033
Patented Apr. 16, 1963

3,086,033
1-METHYL-17-ALKYL-11-OXYGENATED
Δ¹,³,⁵⁽¹⁰⁾-ESTROGENIC COMPOUNDS
Klaus Irmscher and Klaus Bruckner, Darmstadt, Germany, assignors to E. Merck Aktiengesellschaft, Darmstadt, Germany, a corporation of Germany
No Drawing. Filed Mar. 7, 1961, Ser. No. 93,850
Claims priority, application Germany Mar. 11, 1960
10 Claims. (Cl. 260—397.45)

The present invention relates to novel 1-methylestrone derivatives and processes for the preparation thereof.

It has been found that a number of hitherto unknown 1-methylestrone derivatives have very valuable pharmacological properties. The derivatives in question are compounds corresponding to the following formula, hereinafter designated as Formula III:

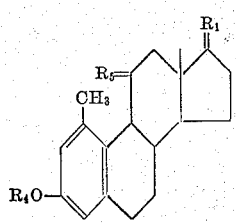

wherein:
$R_1$ is preferably

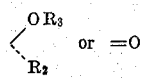

$R_2$=H, or an alkyl or alkenyl hydrocarbon having 1 to 5 carbon atoms and preferably ethynyl
$R_3$=H or an acyl having 1 to 9 carbon atoms
$R_4$=H, an alkyl or acyl having 1 to 9 carbon atoms
$R_5$=H, $OR_3$ or =O These compounds possess a very high antilipemic strength and are distinguished particularly by a very favorable relationship between their antilipemic and estrogenic strength. Furthermore, the therapeutic effect of these compounds is increased, when the 17-keto group is functionally altered through reaction with a nitrogen-containing carbonyl reagent, and particularly when the altered compound is perorally administered.

Additionally, these compounds can be used as intermediates for producing further compounds by any one of a number of well known chemical reactions such as the reduction of a carbonyl group to an alcohol with lithium aluminum hydride or the nitration of the 2- and/or 4-carbon atoms by the use of a solution of fuming nitric acid. Consequently, these novel compounds are valuable tools to the steroid chemist in the preparation of new compounds, as well as being of therapeutic value per se.

The process for preparing these compounds comprises converting a compound as represented by Formula I, as follows:

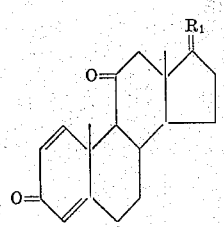

$R_1$, $R_2$ and $R_3$ being the same as in Formula III by treating it with a strong acid in the presence of an acid anhydride in order to obtain a 1-methylestrone derivative as represented by Formula II, as follows:

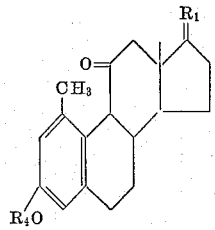

$R_1$ being the same as in Formula III
$R_4$=an acyl group having 1 to 9 carbon atoms In the compound thus obtained the O-acyl group can be saponified in the 3-position, and the free hydroxyl group can eventually be etherified or re-acylated. Moreover, the keto groups in the 11- and/or 17-position of the intermediate or final products obtained according to the invention can also be reduced to hydroxyl groups according to known methods and in a subsequent step the 17-hydroxyl may eventually be acylated, if desired. In this way, there are obtained the compounds as represented by Formula III.

For the preparation of a compound of the Formula III, in which

($R_2$ and $R_3$ having the indicated signification) the keto group in the 17-position can be appropriately converted, either prior to or after the acid treatment. Furthermore, the keto group in the 17-position of the final product obtained in the process according to the invention can be functionally varied by treating it with a nitrogen-containing carbonyl reagent.

The conversion of the Formula I compound into the Formula II compound by treating it with a strong acid in the presence of an acid anhydride occurs under the customary conditions of a dienone-phenol rearrangement. The reaction is suitably carried out in an anhydrous medium. Inorganic as well as strong organic acids and Lewis acids, as for instance perchloric acid, sulfuric acid, sulfonic acids, p-toluene sulfonic acid or zinc chloride, are suitable for the reaction. Among the anhydrides that can be used are preferably: acetic anhydride; propionic anyhdride; butyric anhydride; benzoic anhydride; succinic anhydride or phthalic anhydride. Of course, a steroid chemist can select other operable combinations of acids and acid anhydrides from the practically numberless possibilities that are present.

The rearrangement can be conducted in an especially advantageous way by using perchloric acid in the presence of acetic anhydride. It is also preferred to carry out the reaction in acid concentrations which are not too strong, that is, less than about 1% based on the acid anhydride. For example, where perchloric acid in acetic anhydride is used, acid concentration of, for instance, below 1%, preferably about 0.05%, yield satisfactory results.

In general, the mol ratio of anhydride to acid is approximately about 2000:1; and the mol ratio of anhydride to the Formula I compound is about 200:1 respectively. The reaction can be conducted at from about −10 to +70° C., and preferably for the purposes of convenience, it can be conducted at room temperature. The reaction can be conducted at atmospheric, superatmospheric or subatmospheric pressures; however, it is preferred to conduct it at atmospheric pressure. In general, the time of the reaction varies from 1 to 20 hours, but of course, it is sufficient to conduct the reaction only until some of the desired product is obtained.

The 1-methyl-3-acyloxyestrone derivatives (Formula II) can be saponified to the corresponding 3-hydroxyl compounds by conventional saponification techniques, for instance, by the action of an aqueous solution of sodium bicarbonate, sodium carbonate or sodium hydroxide or also by an acid saponification for instance, by a treatment with muriatic acid in an alcoholic solution. Of course, this step is accomplished with acids or bases of sufficient strength for sufficient times and at sufficient temperatures to saponify at least a portion of the ester groups. In general, it is preferred to use an acid strength of about 3% for acid saponification at 0° to 120° temperatures for 2 to 10 hours; and in the case of alkali saponification to use an alkali strength of 1 to 4%, for 0.3 to 6 hours, at 0 to 120° C.

A thus obtained 1-methyl-3-hydroxyestrone derivative can be converted into the corresponding 3-alkyl ether according to known etherification methods, as for instance, by the action of dimethyl or diethyl sulfate. In general, the mol ratio of the etherification agent to the 1-methyl-3-hydroxy-estrone derivative should be about 1:50, the reaction conducted for about 1 to 8 hours at 0 to 100° C.

In case the 1-methyl-3-acyloxy-estrone derivatives of the Formula II prepared according to the invention also contain an O-acyl group in the 17-position, the latter can be saponified simultaneously with the 3-O-acyl group or eliminated by reduction with lithium aluminum hydride.

Keto groups in the 11- and/or 17-position contained in the obtained intermediate or final products can be reduced to hydroxyl groups according to methods known per se. Lithium aluminum hydride or sodium borohydride can be used as reducing agents. In general, it is preferred to use a mol ratio of the hydride to the steroid of about 10:1, and to conduct the reaction for 0.3 to 5 hours at −10 to +100° C.

For the preparation of the Formula III compound of this invention, it is possible to start from 1-dehydro-adrenosterone as well as from compounds of Formula I, which contain in the 17-position an hydroxyl or O-acyl group, respectively, and a saturated or an unsaturated hydrocarbon residue. If necessary, the 17-keto group, provided that one proceeds from 1-dehydro-adrenosterone, can be varied prior to, or after the dienone-phenol rearrangement, for instance, by means of a conventional Grignardization or ethylenization reaction. To prevent any possibility of confusion, the structural formula of 1-dehydro-adrenosterone is:

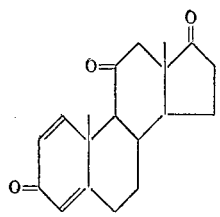

The known alkyl magnesium halogenides can be used as Grignard's reagents. By this conversion, the corresponding 17α-alkyl-17β-hydroxy steroids are obtained. In general, it is desirable to use a mol ratio of the Grignard reagent to the steroid of about 1 to 10:1, and to conduct the reaction for 0.5 to 6 hours at −10 to 100° C.

A monoethynyl magnesium halogenide or an alkali acetylide, preferably lithium acetylide, can be used as an ethylenization agent. Liquid ammonia or tertiary alcohols, such as tertiary butanol, are suitable solvents for the conversion by means of an alkali acetylide. In general, the mol ratio of the acetylide to the steroid should be about 10:1, the reaction conducted for about 2 to 48 hours, and at −10 to 100° C.

By acetylenization, the corresponding 17α-ethynyl steroids are formed, which can be converted into the corresponding 17α - ethynyl - 17β - hydroxy compounds by means of a partial hydrogenation. Such an hydrogenation can be carried out, for instance, by means of hydrogen in the presence of a palladium catalyst. In addition, a further hydrogenation of the 17α-ethynyl group results in the preparation of the corresponding 17α-ethyl-17β-hydroxy steroids. In general, the weight ratio of the catalyst to the steroid should be at least about 1:200, and the hydrogen continuously intermixed with the reaction until hydrogenation takes place. This reaction can be conducted at 0 to 100° C.

In accordance with this invention, hydroxy groups of the intermediate or final products can be esterified by conventional methods. In principle, it is obvious that all kinds of acids are suited for esterification. With respect to the physiological requirements of the final products, however, only those acids can be used for esterification which yield physiologically compatible esters. The following acids, for example, or their derivatives, appropriate for esterification or an interchange of ester radicals, can be used: carboxy acids such as acetic acid, propionic acid, phenyl propionic acid, phenyl acetic acid, butyric acid, trimethyl acetic acid, cyclopentyl propionic acid, and also benzoic acid or hexahydrobenzoic acid. For the preparation of water soluble derivatives it is also possible to esterify the hydroxy groups with dicarboxylic acids or aminocarboxylic acids or with an orthophosphoric acid or sulfuric acid. In this way, there can be produced, for instance: succinates, oxalates, or the acid salts of aminocarboxy acids or the hydrochlorides of a dialkylaminocarboxy acid-steroid esters. In general, the mol ratio of the acid to the steroid is about 1 to 5:1, the reaction conducted for 0.5 to 24 hours at 0 to 100° C.

Hydroxylamine, isonicotinic acid hydrazide or a derivative of the isonicotinic acid hydrazide substituted in the nicotinic acid residue are preferred as the nitrogen-containing carbonyl reagents used for converting the 17-keto group. The conversion is carried out in the usual way, for instance, in an alcoholic aqueous solution of the steroid in the presence of sodium acetate and hydroxylamine hydrochloride. The corresponding isonicotinic acid hydrazide can be produced, for instance, by heating the contents of the reaction. In general, the weight concentration of the steroid in the alcoholic solution is 0.5 to 10%, the mol ratio of sodium acetate to the steroid about 2 to 30:1, and the mol ratio of the nitrogen-containing carbonyl reagent about 1 to 5:1. The reaction is usually conducted for about 0.3 to 6 hours at 0 to 100° C.

The following compounds, having an antilipemic effect, are examples of those which can be obtained by the present invention:

1-methyl-11-oxo-estrone
1-methyl-11-oxo-esterone-3-acetate
1-methyl-11-oxo-estrone-3-methylether
1,17α-dimethyl-11-oxo-estradiol-3-methylether
1-methyl-11-oxo-17α-ethyl-estradiol-3-methylether
1-methyl-11-oxo-estrone-17-oxime
1-methyl-11-oxo-estrone-3-acetate-17-oxime
1-methyl-11-oxo-estrone-3-methylether-17-oxime
1-methyl-estra-1,3,5-(10)-triene-3,11β,17β-triol
1-methyl-estra-1,3,5(10)-triene-3,11β,17β-triol-3-methylether
1,17α-dimethyl-estra-1,3,5(10)-triene-3,11β,17β-triol-3-methylether
1-methyl-17α-ethyl-estra-1,3,5(10)-triene-3-11β,17β-triol-3-methylether
1-methyl-11-oxo-17α-ethynyl-estradiol-3-methylether
1,17α-dimethyl-11-oxo-estradiol
1-methyl-11-oxo-17α-ethyl-estradiol
1,17α-dimethyl-estra-1,3,5(10)-triene-3,11β,17β-triol
1-methyl-17α-ethyl-estra-1,3,5(10)-triene-3,11β,17β-triol
1-methyl-17α-ethynyl-estra-1,3,5(10)-triene-11β,17β-diol-3-methylether The reactants represented by Formula I are easily accessible. Thus, 1-dehydro adrenosterone, for instance, can be obtained for prednisone by oxidation according to known methods, for instance, by sodium bismuthate.

Starting materials containing in the 17-position alkyl groups or unsaturated hydrocarbon residues according to Formula I, can be produced according to the above-described process, for instance, from 1-dehydro-adrenosterone.

On account of their satisfactory antilipemic action, the compounds of this invention can be used for the treatment of human beings. The new steroids can be processed into all kinds of pharmaceutical preparations, e.g., tablets, pills, dragees, suppositories, emulsions, suspensions and injection solutions, and also the usual admixtures can be used as, for instance, auxiliary tableting means, soluble intermediates or coatings for dragees.

EXAMPLE I

1-Methyl-11-Oxo-Estrone-3-Acetate

Five g. of 1-dehydro-andrenosterone are admixed with 200 cc. of acetic anhydride containing 0.15 cc. of perchloric acid of 70% strength. After 6½ hours, the mixture is poured into 1.5 liters of water, then agitated for fifteen minutes and extracted with chloroform thereby forming an extract and a residue. The extract is then freed from acid by washing it with small portions of ice-cold 5% sodium hydroxide; and subsequently washed until neutral and dried. The residue, after the solvent is distilled off, is vaporized several times with methanol in order to eliminate any remaining acetic anhydride. The residue is then dissolved in chloroform and filtered over a Florisil column. The filtrate is then concentrated by evaporation to dryness and then recrystallized. The 1-methyl-11-oxo-estrone-3-acetate resulting therefrom has the following characteristics: melting point 220°; $(\alpha)_D^{25}$ +384° (chloroform); $\lambda_{max}$ 264–265 m$\mu$, $$E_{1\,cm.}^{1\%} = 10.8;\ \epsilon = 372$$

EXAMPLE II

1-Methyl-11-Oxo-Estrone

Five g. of 1-methyl-11-oxo-estrone-3-acetate admixed with 200 cc. of a 2% methanolic potash lye are heated with reflux to ebullition. This mixture is then concentrated in vacuum to 50 cc., diluted with 1 liter of water and extracted with chloroform. The aqueous phase is then acidified with dilute sulfuric acid and again extracted with chloroform. The extract is then worked up in the usual way and the ether residue crystallized. For the purpose of further purification it is advisable to incorporate a treatment with activated carbon in methanol. The pure 1-methyl-11-oxo-estrone has the following characteristics: melting point 254°; $(\alpha)_D^{25}$ +442° (chloroform); IR bonds at 3330.873 and 856 cm.$^{-1}$; $\lambda_{max}$ 283–284 m$\mu$, $$E_{1\,cm.}^{1\%} = 54.7;\ \epsilon = 1630$$

EXAMPLE III

1-Methyl-11-Oxo-Estrone-3-Methyl Ether

A quantity of 250 mg. of 1-methyl-11-oxo-estrone are dissolved in 50 cc. of n/2-sodium hydroxide and after 2.5 cc. of dimethyl sulfate have been added, the mixture is vigorously stirred for two hours. The resulting mixture is then decanted and heated with n/2-sodium lye under agitation for one hour to 60° C. After it has cooled, it is extracted with chloroform and worked up as usual. The 1-methyl-11-oxo-estrone-3-methylether has the following characteristics: melting point 196°, from ether; IR-bonds at 1068 and 852 cm.$^{-1}$; $\lambda_{max}$ 286 m$\mu$, $$E_{1\,cm.}^{1\%} = 48.2;\ \epsilon = 1510$$

EXAMPLE IV

1,17α-Dimethyl-11-Oxo-Estradiol-3-Methylether

A solution of five g. of 1-methyl-11-oxo-estrone-3-methylether is dropped into a boiling Grignard's reagent consisting of 3 g. of magnesium and 17.5 g. of methyl iodide. The mixture is heated for eight hours with reflux to its boiling point; then, after standing over night, the reaction mixture is decomposed with ice and muriatic acid. By the usual working up, the 1.17α-dimethyl-11-oxo-estradiol-3-methylether is obtained. Melting point 165°, $(\alpha)_D^{25}$ +295°;

$\lambda_{max}$ 276 m$\mu$, $E_{1\,cm.}^{1\%}$ 44.1; $\lambda_{max}$ 283.5 m$\mu$, $E_{1\,cm.}^{1\%}$ 44.2

EXAMPLE V

1-Methyl-11-Oxo-Estrone-3-Acetate-17-Oxime

A quantity of 950 mg. of 1-methyl-11-oxo-estrone-3-acetate with a concentrated aqueous solution of 500 mg. hydroxylaminohydrochloride and 600 mg. of sodium acetate are dissolved in 10 cc. of alcohol and heated for one hour to ebullition with reflux. The reaction mixture is mixed in water by stirring, the precipitating 1-methyl-11-oxo-estrone-3-acetate-17-oxime is filtered off and recrystallized from ethanol. Melting point 137–138° C.

EXAMPLE VI

1-Methyl-11-Oxo-17α-Ethynyl-Estradiol-3-Methylether

Five g. of potassium are dissolved in 100 cc. of tertiary amyl alcohol; 100 cc. of ether are added to this mixture, and it is then cooled to 0° C. Subsequently, dry acetylene gas is slowly bubbled into the agitated mixture. After one hour, 5.2 g. of 1-methyl-11-oxo-estrone-3-methylether are added to the mixture, and acetylene gas is continuously introduced into the mixture for another twenty-four hours while the temperature is caused to progressively increase to room temperature. Then a 10% ammonium chloride solution is added until an acid reaction occurs; the tertiary amyl alcohol is eliminated by means of steam distillation; the precipitating 1-methyl-11-oxo-17α-ethynyl-estradiol-3-methylether is filtered off and recrystallized from acetone. Melting point 95°, $(\alpha)_D^{20}$ +113° (chloroform); $\lambda_{max}$ 273 m$\mu$.

EXAMPLE VII

1-Methyl-Estra-1,3,5(10)-Triene-11β,17β-Diol-3-Methylether

A solution of 3.7 g. of 1-methyl-11-oxo-estrone-3-methylether is dropped under stirring into a suspension of 3 g. of lithium aluminum hydride in 200 cc. of absolute tetrahydrofuran. The mixture is heated for thirty minutes with reflux to ebullition. The excess of lithium alanate is decomposed with acetic ester and worked up as usual. Thereby the 1-methyl-estra-1,3,5(10)-triene-11β,17β-diol-3-methylether is obtained having the following characteristics: melting point 206° C. from ether/cyclohexane; $(\alpha)_D^{24}$ −98° (chloroform);

$\lambda_{max}$ 275 m$\mu$, $E_{1\,cm.}^{1\%} = 37$; $\lambda_{max}$ 279 m$\mu$, $E_{1\,cm.}^{1\%} = 37$; $\lambda_{max}$ 282.5 m$\mu$, $E_{1\,cm.}^{1\%} = 38$ (ethanol)

EXAMPLE VIII

1,17α-Dimethyl-11-Oxo-Estradiol

In analogy to the method described in Example IV, 1,17α-dimethyl-11-oxo-estradiol is prepared from 1-methyl-11-oxo-estrone. The reaction is refluxed for 7 hours.

EXAMPLE IX

1-Methyl-11-Oxo-17α-Ethyl-Estradiol

In analogous manner to that described in Example IV and using ethyl bromide instead of methyl iodide, 1-methyl-11-oxo-17α-ethyl-estradiol is prepared from 1-methyl-11-oxo-estrone.

EXAMPLE X

1-Methyl-11-Oxo-17α-Ethyl-Estradiol-3-Methylether

In analogy to the method of Example IV, using ethyl iodide instead of methyl iodide, the 1-methyl-11-oxo-17α-ethyl-estradiol-3-methylether is obtained.

EXAMPLE XI (a) According to the method described in Example V, 1-methyl-11-oxo-estrone-17-oxime is prepared from 1-methyl-11-oxo-estrone.

(b) According to the method described in Example V, 1-methyl-11-oxo-estrone-3-methylether - 17 - oxime is obtained from 1-methyl-11-oxo-estrone-3-methylether.

EXAMPLE XII

*1-Methyl-Estra-1,3,5(10)-Triene-3,11β,17β-Triol*

According to the method described in Example VII, 1-methyl-estra-1,3,5(10)-triene - 3,11β,17β - triol is prepared from 1-methyl-11-oxo-estrone in a reaction time of 1 hour.

EXAMPLE XIII

According to the method described in Example VII, 1,17α-dimethyl-estra-1,3,5(10)-triene-3,11β,17β-triol is prepared from 1,17α-dimethyl-11-oxo-estradiol.

In the same manner, 1-methyl-17α-ethyl-estra-1,3,5(10)-triene-3,11β,17β-triol is prepared from 1-methyl-11-oxo-17α-ethyl-estradiol.

EXAMPLE XIV

According to the method of Example VII using 300 cc. of tetrahydrofurane as solvent, 1,17α-dimethyl-estra-1,3,5(10)-triene-11β,17β-diol-3-methylether is prepared from 1,17α-dimethyl-11-oxo-estra-diol-3-methylether.

In the same manner, 1-methyl-17α-ethynyl-estra-1,3,5(10)-triene-11β,17β-diol-3-methylether is prepared from 1-methyl-11-oxo-17α-ethynyl-estradiol-3-methylether.

EXAMPLE XV

In accordance with the method of Example VII, using dioxane as solvent, 1-methyl-17α-ethyl-estra-1,3,5(10)-triene-3,11β,17β-triol-3-methylether is obtained from 1-methyl-11-oxo-17α-ethyl-estradiol-3-methylether.

EXAMPLE XVI

*1-Methyl-11-Oxo-17α-Ethenyl-Estradiol-3-Methylether*

5.2 g. of 1 - methyl - 11 - oxo-17α-ethynyl-estra-diol-3-methylether are hydrogenated in 400 cc. of pyridine at 50° C. in the presence of 1 g. of a prereduced catalyst of palladium/calcium-carbonate (2%). The addition of hydrogen is finished when 530 cc. of hydrogen are taken up by the reaction mixture. The catalyst is filtered off and washed with ethyl acetate. The combined solutions are evaporated to dryness under reduced pressure. The residue is recrystallized from ether/petroleum ether.

EXAMPLE XVII

*1-Methyl-11-Oxo-Estrome-3-Cyclohexyl-Propionate*

1.5 g. of 1-methyl-11-oxo-estrone are refluxed for two hours with 2.5 cc. of benzene, 0.3 cc. of pyridine and 1.4 cc. of octahydrocinnamic acid chloride. The reaction mixture is chromatographed through a column of florisil. The crude product is recrystallized from methanol.

EXAMPLE XVIII

*1-Methyl-3,17-Diacetoxy-1,3,5(10)-Estratriene-11β-Ol*

5 g. of 1-methyl-1,3,5(10)-estratriene-3,11β,17β-triol are allowed to stand for 15 hours at room temperature with 25 cc. of pyridine and 25 cc. of acetic anhydride. The reaction mixture is worked up with chloroform and water in the usual way. The crude product is recrystallized from methanol/water.

EXAMPLE XIX

*1 - Methyl - Di - 3,17 - (Cyclohexyl - Propionoxy)-1,3,5(10)-Estratriene-11β-Ol*

In accordance with the method described in Example XVIII, 1 - methyl-di - 3,17 - (cyclohexyl-propionoxy)-1,3,5(10)-estratriene-11β-ol is prepared using 10 cc. of octahydro-cinnamic acid chloride instead of acetic anhydride.

It will be understood that the invention is susceptible to modification in order to adapt it to different usages and conditions and, accordingly, it is desired to comprehend such modifications within the invention as may fall within the scope of the appended claims.

What we claim is:
1. 1,17α-dimethyl-11-oxo-estradiol.
2. 1,17α-dimethyl-11-oxo-estradiol-3-methylether.
3. 1-methyl-11-oxo-17α-ethyl-estradiol-3-methylether.
4. 1-methyl-11-oxo-estrone-17-oxime.
5. 1-methyl-11-oxo-estrone-3-acetate-17-oxime.
6. 1-methyl-11-oxo-estrone-3-methylether-17-oxime.
7. 1-methyl-estra-1,3,5(10)-triene-3,11β,17β-triol.
8. 1 - methyl - estra - 1,3,5(10) - triene - 11β,17β-diol-3-methylether.
9. 1 - methyl - 17α - ethynyl - estra - 1,3,5(10) - triene-11β,17β-diol-3-methylether.
10. 1 - methyl - 11 - oxo - 17α - ethynyl - estradiol-3-methylether.

References Cited in the file of this patent

UNITED STATES PATENTS

| | | |
|---|---|---|
| 2,671,092 | Djerassi et al. | Mar. 2, 1954 |
| 2,791,592 | Djerassi et al. | May 7, 1957 |
| 2,874,173 | Hogg et al. | Feb. 17, 1959 |
| 2,991,295 | Magerlein et al. | July 4, 1961 |

OTHER REFERENCES

Elks et al.: "Proc. Chem. Soc." (1959), page 6.
Kirk et al.: "Journal Chem. Soc.," November 1960, pages 4664–4668.